Figure 3:
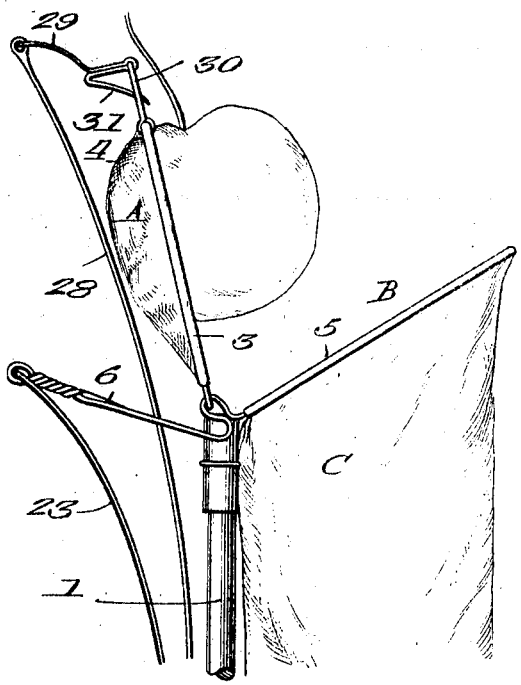

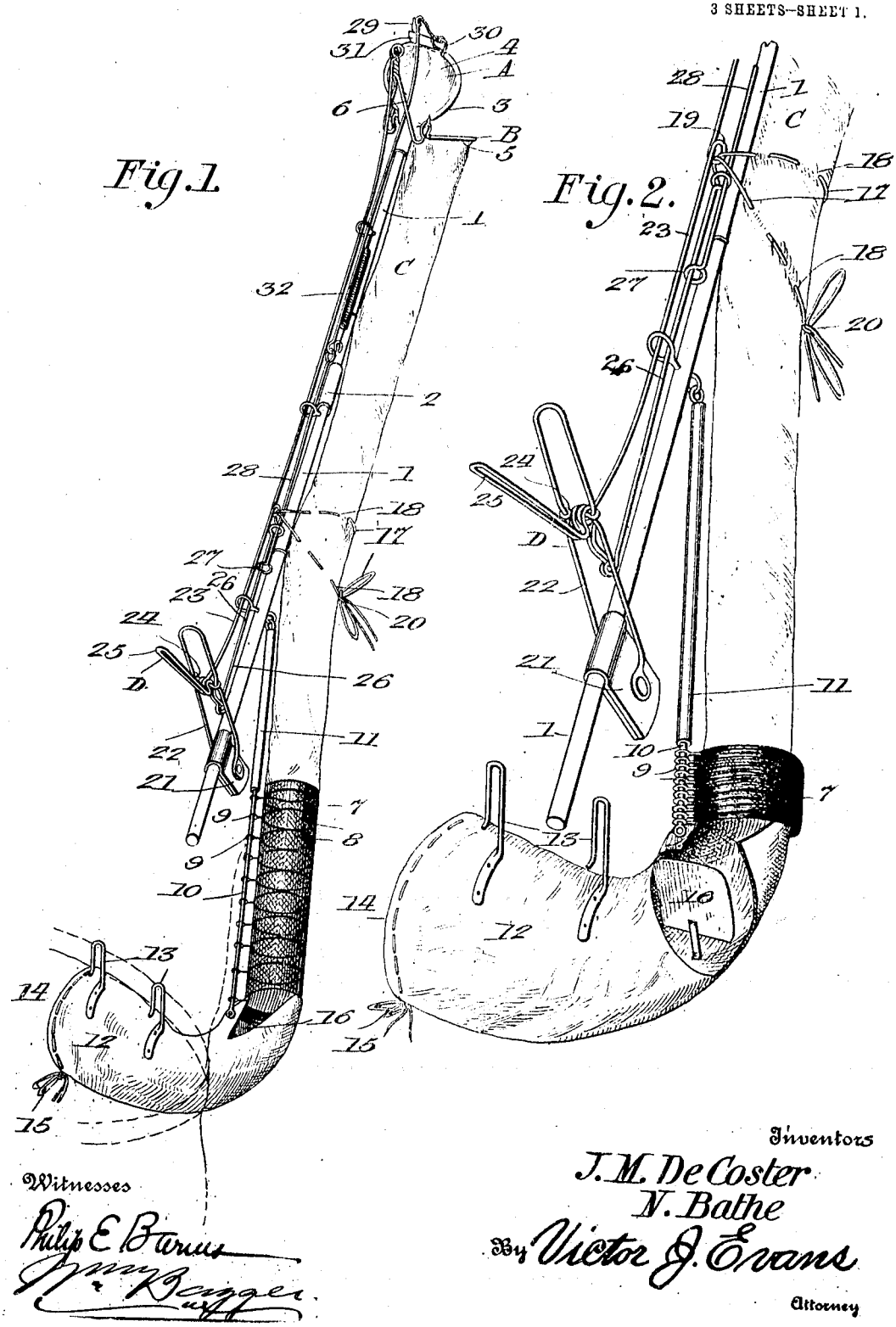

J. M. DE COSTER & N. BATHE.
FRUIT PICKER.
APPLICATION FILED JAN. 24, 1912.

1,053,789.

Patented Feb. 18, 1913.

3 SHEETS—SHEET 2.

Inventors
J. M. De Coster
N. Bathe
By Victor J. Evans
Attorney

Witnesses.
Philip E. Barnes

J. M. DE COSTER & N. BATHE.
FRUIT PICKER.
APPLICATION FILED JAN. 24, 1912.
1,053,789. Patented Feb. 18, 1913.
3 SHEETS—SHEET 3.
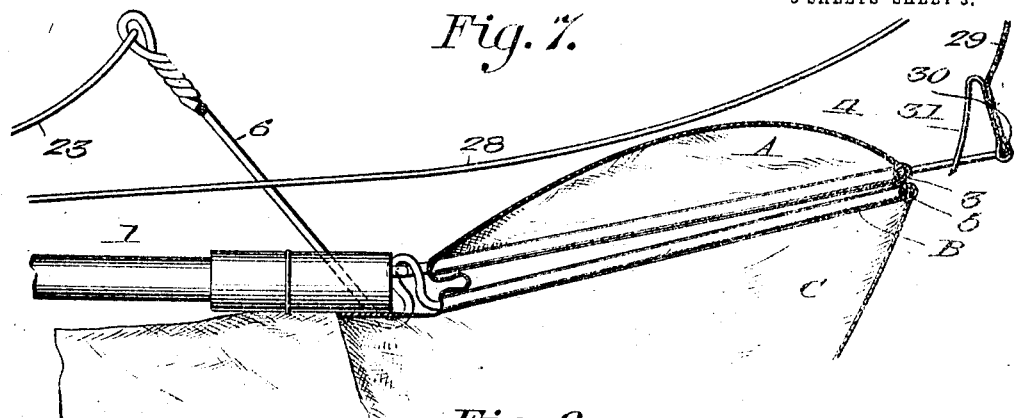
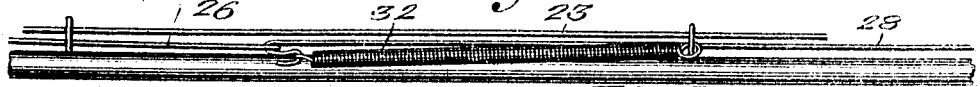
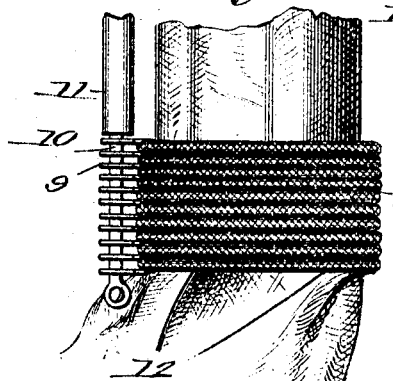
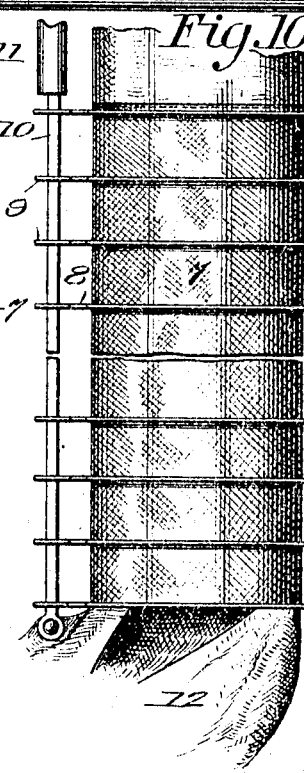
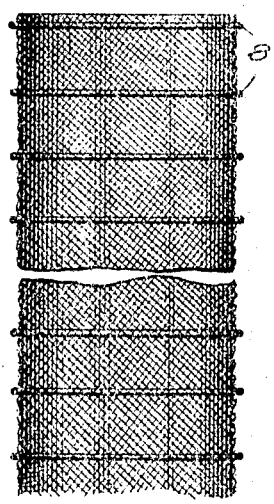
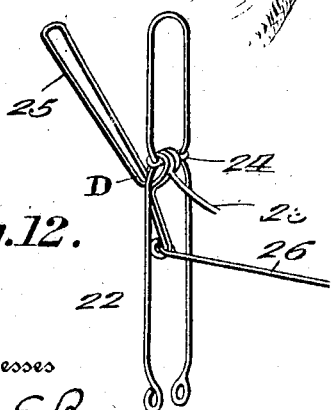
Inventors
J. M. De Coster
N. Bathe
By Victor J. Evans
Attorney
Witnesses
Philip E. Barnes

UNITED STATES PATENT OFFICE.

JULES M. DE COSTER AND NATHANIEL BATHE, OF ST. LOUIS, MISSOURI.

FRUIT-PICKER.

1,053,789.  Specification of Letters Patent.  Patented Feb. 18, 1913.

Application filed January 24, 1912. Serial No. 673,119.

*To all whom it may concern:*

Be it known that we, JULES M. DE COSTER and NATHANIEL BATHE, citizens of the United States, residing at St. Louis, State of Missouri, have invented new and useful Improvements in Fruit-Pickers, of which the following is a specification.

This invention relates to fruit pickers of that class or type in which a pair of jaws supported by a rod to be carried by the operator are associated with a flexible tube through which the fruit after being detached is conveyed to a sack or receptacle which may also be carried by the operator.

One object of the present invention is to provide in combination with the jaws that engage and surround the fruit a cutting device mounted upon one of said jaws for cutting or severing the stem of the fruit, enabling the fruit to be detached without pulling it from the stem in a manner which frequently proves injurious to the fruit or to the tree or to both.

A further object of the invention is to provide simple and improved means associated with the jaw operating means for the purpose of actuating the stem cutting device.

A further object of the invention is to improve the construction of the conducting tube leading from the jaws to the receptacle, making said tube extensible and collapsible so that the jaw carrying rod may be raised or lowered according to the position of the fruit that is to be detached without straining the tube in the act of raising the rod or causing it to become tangled, thereby obstructing the descent of the fruit when the rod is lowered.

A further object of the invention is to provide in connection with the conducting tube simple and efficient means for partly obstructing the tube so as to check the descent of the fruit, said means being partly provided for the purpose of enabling the device to be used with equal facility and efficiency for the purpose of picking fruits of various sizes, such as apples, pears, peaches and plums and the like.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 4:
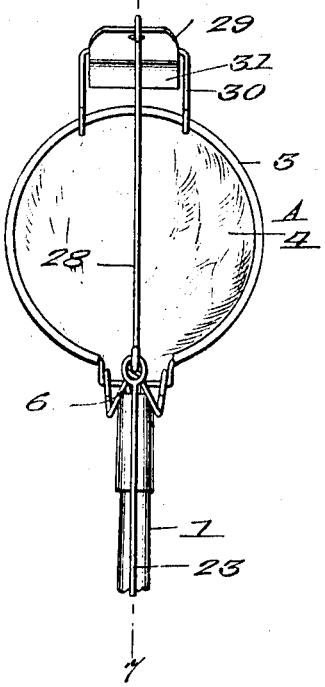
Figure 5:
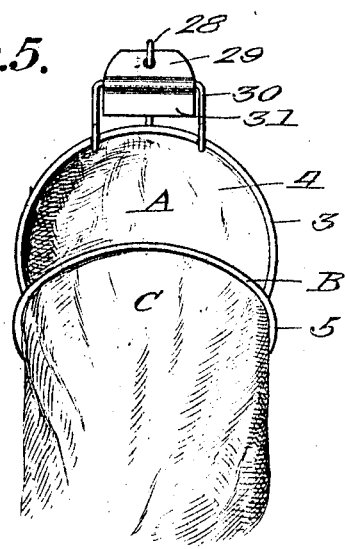
Figure 6:
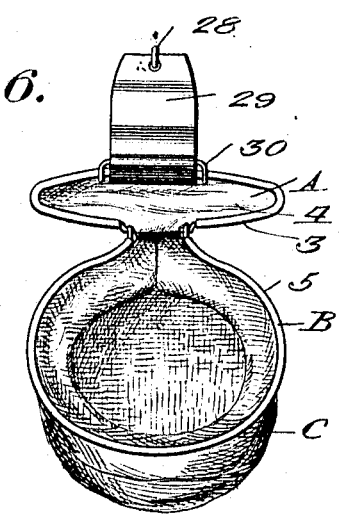

In the drawings,—Figure 1 is a perspective view of the device showing the supporting rod elevated with reference to the receptacle, and showing the conducting tube correspondingly extended. Fig. 2 is a perspective view showing the supporting rod lowered with reference to the receptacle and showing the conducting tube correspondingly collapsed. Fig. 3 is an edge view of the upper or jaw carrying portion of the device, showing the jaws open in the act of receiving a fruit between them. Fig. 4 is a rear elevation of the same exhibiting the side of the stationary jaw. Fig. 5 is a front elevation seen from the opposite side. Fig. 6 is a top plan view. Fig. 7 is a vertical sectional view taken on the line 7—7 in Fig. 4, and showing the jaws closed together. Fig. 8 is an edge view, enlarged, of an intermediate portion of the device. Fig. 9 is an edge view of the lower portion of the device showing the conducting tube collapsed. Fig. 10 is a similar view showing the conducting tube extended. Fig. 11 is a sectional view taken vertically through the collapsible portion of the conducting tube. Fig. 12 is an enlarged perspective view, showing the operating levers.

Corresponding parts in the several figures are denoted by like characters of reference.

The rod or pole of the improved fruit picker may be made up of a plurality of sections 1, 1 connected together at their meeting ends by a sleeve 2 enabling the sections to be readily separated for convenience in storing or shipping the device. Firmly connected with the upper end of the pole is a stationary jaw A consisting of a ring or hoop 3 having a loose cap or covering 4 of flexible, preferably textile material. Hingedly connected with the jaw A adjacent to the upper end of the rod or pole is a movable jaw B comprising a hoop or ring 5 and an arm 6, which latter constitutes a lever whereby the jaw B may be operated. Suitably connected with the hoop 5 of the jaw B is the upper end of a flexible tubular duct C which is mainly constructed of textile material, such as cotton or canvas. The lower end of the duct C includes a section which is preferably made up of netting 7, said netting being suitably connected with a plurality of hoops 8, each of which has an eye 9 slidably engaging a rod or wire 10 which telescopes in a tube 11, the upper end of which is suitably connected with the rod or pole 1. The duct section composed of the netting 8 and the hoops 9 is adapted to be collapsed, as will be readily understood by reference to Fig. 2, and when thus collapsed the hoops 9 will maintain the netting in unobstructed position with reference to the interior of the ducts, so that fruits may readily pass through the collapsed section or portion of the tube or duct. The lower end of the duct S, which is synonymous with the lower end of the collapsible section of said duct, is suitably connected with the mouth of the receptacle consisting of a sack 12 having hooks 13, whereby it may be supported upon the belt of the operator. The sack or receptacle 12 is also provided with an outlet 14 which may be closed by means of a draw-string 15.

Suitably arranged within the mouth of the receptacle 12 adjacent to the lower end of the duct is a transverse strip of flexible material 16 which constitutes an obstruction to the fruit passing from the duct into the receptacle to break the fall thereof and to enable it to pass into the receptacle without bruising or injuring or becoming bruised or injured by contact with fruits already in said receptacle.

For the purpose of regulating the diameter of the duct and adapting the same for fruits of different sizes, obliquely disposed strings 17 are threaded through the material of the tube adjacent to the outer portion of the circumference of the latter at points 18 which are a suitable distance apart, said strings being guided around the tube or duct to surround the same, after which they are tied together adjustably, as indicated at 20. It will be readily seen that by loosening or tightening said strings, the extent to which the tube or duct may expand circumferentially may be regulated to obstruct the passage of fruits above a predetermined size, it being found desirable to check the too rapid descent of the fruit. This object is accomplished in the manner stated without the possibility of injury to the fruit. The strings 17 act simply as draw-strings whereby the soft flexible material of the tubular duct may be more or less "puckered" to vary the internal area of said tubular duct at the points engaged by the draw-strings.

Pivotally connected with a bracket 21 which is clamped or otherwise suitably secured upon the rod or pole 1 near the lower end of the latter is a lever 22, said lever being connected by a link rod 23 with the arm 6 of the movable jaw B, which latter may thus be actuated to move it toward or from the stationary jaw A. The rod 23 has an eye 19 through which the draw-strings 17 are guided. The operating lever 22 has been shown as consisting of a yoke, the same being provided with a cross bar 24 on which a second lever D is fulcrumed, one arm of said lever D constituting a handle 25, while the other arm is connected with the lower end of a link 26 which slides through an eye 27 at the lower end of a connecting rod 28. The upper end of said rod 28 is connected with one arm of a bell crank 29 which is fulcrumed upon a keeper 30 that extends upwardly from the stationary jaw A, the other arm of said bell crank being provided with a cutting blade 31 which is adapted to move adjacent to the upper portion of the stationary jaw A for the purpose of severing the stem of a fruit that is held or grasped between the jaws. A retracting spring 32 connects the connecting rod or member 28 with the pole 1.

In the operation of this invention, the sack or receptacle 12 is suspended by means of the hooks 13 from the belt of the operator who carries the rod or pole 1 which may be made of bamboo or other light material in one hand, while with the other hand he manipulates the operating lever 22 to actuate the movable jaw B. When the jaws A and B are spaced apart in open relation, the device is presented to the fruit that is to be picked, the fruit being grasped between the jaws by manipulating the lever 22 to cause the movable jaw to close against the stationary jaw. The lever D is now actuated to operate the cutting member carried by the bell crank 29, thereby severing the stem of the fruit, which latter by slightly relaxing the pressure upon the movable jaw will now be permitted to drop through the tubular chute or duct into the bag or receptacle, the drop being checked by the transversely disposed flexible member 16. The pole 1 may be raised or lowered to conveniently reach fruits growing high or low without interfering with the efficiency of the tubular duct or chute owing to the presence of the collapsible portion of said duct.

The general construction of the device is simple and inexpensive, and it has been found thoroughly efficient for the purpose for which it is provided.

Having thus described the invention, what is claimed as new, is:—

1. In a fruit picker of the type described, a stationary jaw, a movable jaw connected therewith, a tubular duct connected with the movable jaw, a cutting member movably mounted upon the stationary jaw and means for actuating the cutting member.

2. In a fruit picker, a stationary jaw mounted upon a pole, a bell crank supported upon the stationary jaw and having a cutting member, a movable jaw pivotally connected with the stationary jaw and having a tubular duct connected therewith, means for actuating the movable jaw, and means for actuating the bell crank carrying the cutting member.

3. In a fruit picking device, annular jaws connected therewith, one stationary and the other pivoted, said jaws adapted to surround the fruit and to engage between them the stem of such fruit, in combination with a cutting member movably supported on one of the jaws, means for actuating the pivoted jaw, and additional means for actuating the cutting member.

4. In a fruit picker, a pole constituting a supporting member, a pair of annular hoop-shaped jaws mounted on the device, one of said jaws being stationary and the other movable, a flexible cap connected with the stationary jaw, a tubular duct connected with the movable jaw, a cutting member supported upon the stationary jaw, means for actuating the movable jaw to engage a fruit stem between itself and the stationary jaw, and means for actuating the cutting member.

5. In a fruit picker, fruit engaging and detaching means, a tubular duct, a receptacle connected therewith, and a strip of flexible material secured transversely in the mouth of the receptacle transversely of the duct to break the fall of fruit passing through the duct without obstructing its entrance into the receptacle.

6. In a fruit picker of the class described, a duct having a collapsible section provided with expanding hoops having eyes, a rod on which said eyes are guided and a tube in which said rod telescopes.

7. In a fruit picker, a supporting member, a stationary jaw carried thereby, a movable jaw hinged upon the stationary jaw and having an arm, a bell crank supported upon the stationary jaw and having a cutting member, an operating lever connected with the supporting member, a rod connecting the operating lever with the arm of the movable jaw, an auxiliary lever fulcrumed upon the operating lever, and a rod connecting the auxiliary member with the bell crank carrying the cutting member, said rod including slidably connected members.

8. In a fruit picker, a supporting member, a stationary jaw carried thereby, a movable jaw hinged upon the stationary jaw and having an arm, a bell crank mounted upon the stationary jaw and having a cutting member, an operating lever mounted on the supporting member, a rod connecting said lever with the arm of the movable jaw, an auxiliary lever fulcrumed upon the operating lever, a link connected with one arm of said auxiliary lever, a rod connected with the cutter carrying the bell crank and having an eye through which the link is guided, and a retracting spring connecting said rod with the pole constituting the supporting member.

In testimony whereof we affix our signatures in presence of two witnesses.

JULES M. DE COSTER.
NATHANIEL BATHE.

Witnesses:
 JOSEPH H. EDWARDS,
 JAMES E. BREMNER.